March 22, 1955  A. GREENBAUM  2,704,832
MULTIPLE CORD PLUG RECEPTACLE
Filed March 23, 1954  2 Sheets-Sheet 2
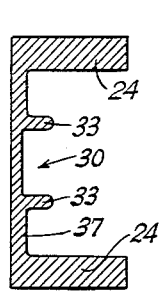
FIG.11
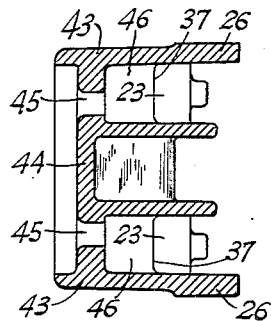
FIG.12
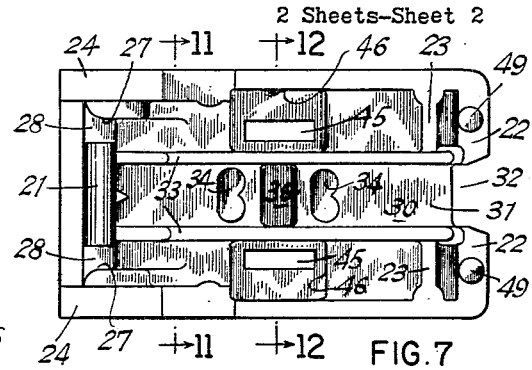
FIG.7
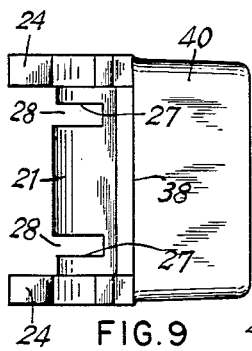
FIG.9
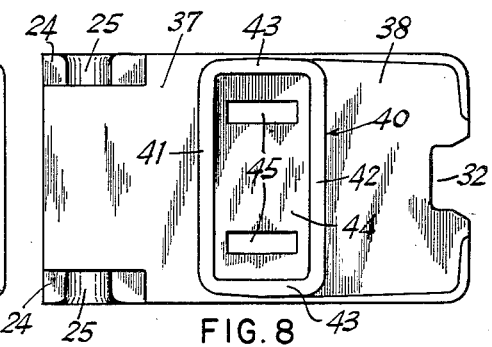
FIG.8
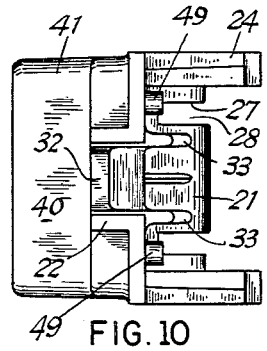
FIG.10
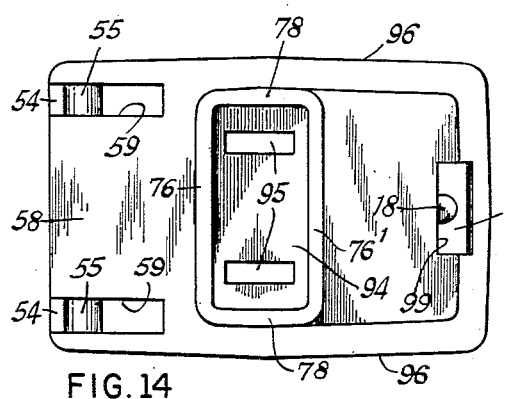
FIG.14
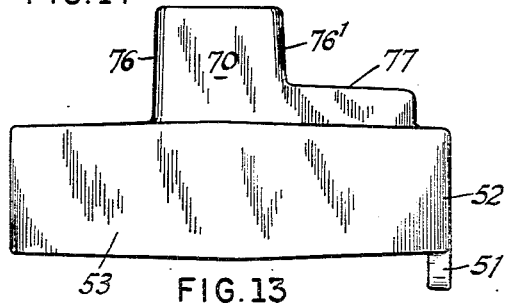
FIG.13
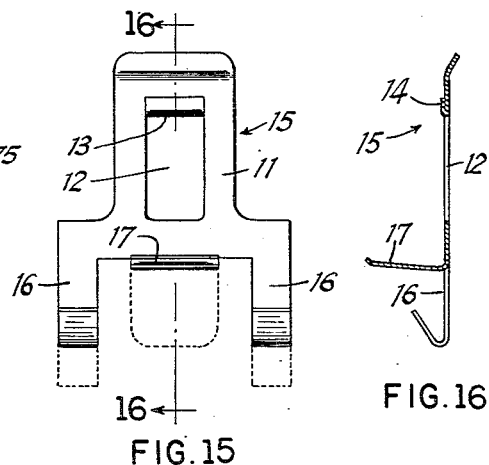
FIG.15
FIG.16
INVENTOR
Arthur Greenbaum
BY
ATTORNEY United States Patent Office 2,704,832
Patented Mar. 22, 1955

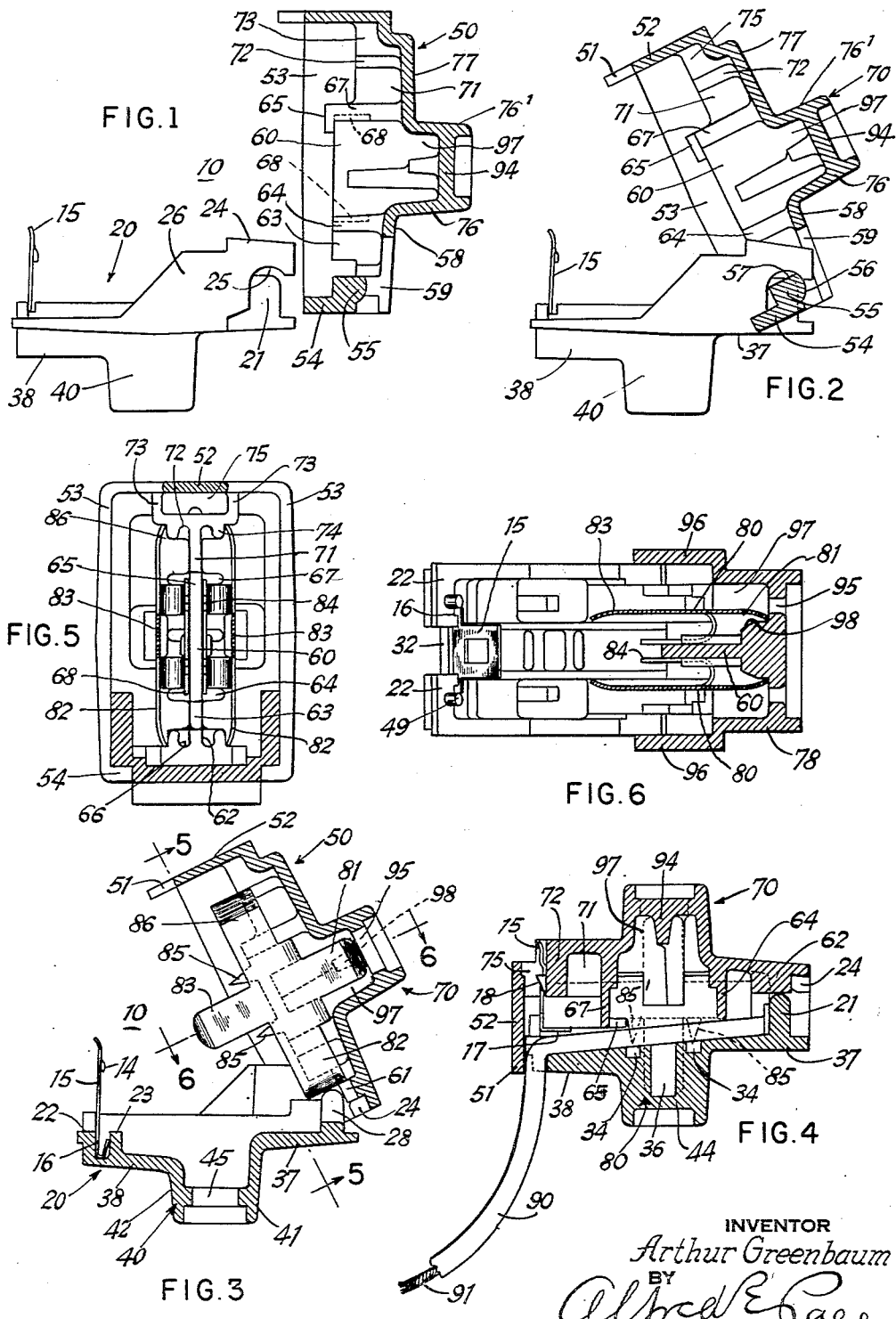

2,704,832

MULTIPLE CORD PLUG RECEPTACLE

Arthur Greenbaum, Tuckahoe, N. Y., assignor to Academy Electrical Products Corporation, New York, N. Y., a corporation of New York Application March 23, 1954, Serial No. 418,115

10 Claims. (Cl. 339—99)

This invention relates to electrical outlet receptacles for electrical and mechanical connection to a two-conductor extension cord to disengageably receive one or more cord plugs. More particularly, the invention is directed to a multiple cord plug receptacle of the "cube tap" type which can be quickly and easily mechanically and electrically connected to a flat type, two-conductor cord without stripping of insulation or slitting of the cord to separate the conductors, and without the use of tools.

Cord plug receptacles of the cube tap type are usually arranged with openings to receive the contact blades of cord plugs on each of three perpendicularly related surfaces, with the extension cord leading generally from a fourth face or surface parallel to the intermediate one of such three surfaces. Generally, such receptacles are formed of two mating sections of dielectric material containing the conductive metal springs or fingers which contact the cord plug blades.

To connect such cube taps to a cord, it is usually necessary to use a screw driver to disengage a bolt and nut assembly interconnecting the two halves, separate the halves, slit the cord to separate the conductors, strip the insulation from the ends of the cord conductors, curl the stripped conductor ends around connection screws or terminals, threaded into the springs or fingers, tighten the connections, reassemble the mating halves, position the bolt in place, and secure the nut to the bolt. This is a time-consuming operation requiring a degree of manipulative skill not possessed by many people, particularly householders. Additionally, great care must be exercised, particularly with stranded conductors, to assure proper separation of metal parts of opposite electrical polarity. Frequently, a loose strand of one conductor will contact the stripped part of the other conductor to establish a short circuit.

To avoid the foregoing difficulties, the present invention is directed to a cube tap comprising two substantially permanently hingedly interconnected cooperating parts of dielectric material enclosing contact springs or fingers and having pairs of cord plug blade receiving openings on three perpendicularly related surfaces. For convenience, these two parts will be hereinafter designated as the "base" and the "cover."

The free end of one part, such as the base, carries a latching spring releasably engageable with means on the other part, such as the cover, to hold the parts in closed relation. This spring is formed to guide a flat, insulated, two-conductor cord into a substantially conforming groove extending along the base inwardly from its free end toward its hinged end. The contact springs, which are carried by the cover, are formed with barbs or points arranged to extend at least part way across the groove when the parts are swung together.

The barbs on one contact spring are in laterally spaced relation to the barbs on the other, and the barbs are so located as to respectively engage and pierce the two stranded conductors of a cord positioned in the groove. Hence, when the parts are closed and latched, each contact spring is electrically and mechanically engaged with a different one of the two conductors.

The hinge ends of the base and cover are formed to cooperatively provide one of the pairs of blade receiving apertures. The hinge connection of the blade and cover is so formed that the blade and cover cannot be readily disengaged, disengagement being inhibited by the contact springs. However, the hinge is of such a nature that the two parts are readily interconnected during assembly by hooking lips on the base beneath trunnions on the cover, the resiliency of the blades providing for snapping these hinge forming portions into cooperative engagement.

The hinge construction is somewhat similar, in principle, to that illustrated, described and claimed in my copending application Serial No. 255,987, filed November 13, 1951, for "Electrical Outlet Receptacle." Such copending application is more particularly directed to an elongated, flat type of multiple outlet receptacle, known as a "table tap" receptacle.

The present invention, while having a somewhat functionally similar type of hinge connection, is directed to novel constructional features more particularly pertinent to its "cube" formation. Provision of multiple outlets in a cube tap operating on the hinging principle presents problems not encountered in designing a hinge type receptacle having all of its outlets in one surface.

Thus, the present invention is directed to the novel shape and location of the contact spring recesses with relation to the blade receiving openings. Also, it is directed to an improved and simplified formation of the cord receiving channel or groove, and to a novel strain-relief arrangement for the cord.

For an understanding of the invention principles, reference is made to the following description of a typical embodiment thereof as illustrated in the accompanying drawings.

In the drawings:

Fig. 1 is a part side elevation and part longitudinal sectional view of the base and cover just prior to interconnection, the base being in elevation and the cover in section;

Fig. 2 is a similar view of the parts hinged together;

Fig. 3 is a longitudinal sectional view of the cube tap with the contact springs assembled therewith, the receptacle being open to receive a cord;

Fig. 4 is a similar view of the receptacle mechanically and electrically connected to a flat two-conductor cord;

Figs. 5 and 6 are sectional views on the lines 5—5 and 6—6, respectively, of Fig. 3;

Fig. 7 is a top plan view of the base;

Figs. 8, 9 and 10 are bottom plan, left end elevation, and right end elevation views of the base;

Figs. 11 and 12 are transverse sectional views of the base on the correspondingly numbered lines of Fig. 7;

Fig. 13 is a side elevation view of the cover;

Fig. 14 is a top plan view of the cover;

Fig. 15 is an elevation view of the latch spring; and

Fig. 16 is a sectional view on the line 16—16 of Fig. 15.

Referring to Figs. 1–6, the invention outlet receptacle 10 is generally uniform in side elevation and includes a base 20 and a cover 50 both molded from a suitable dielectric plastic composition material. The cover and base are arranged to be hingedly interconnected at one end, and to be releasably latched in closed position by a latch spring 15 carried by base 20 and releasably interengageable with an abutment on a surface of cover 50.

The latter supportingly receives the contact springs 80, which are uniform in plan to provide contact fingers 81, 82, 83 extending toward each of the blade receiving slots in the outlet. Each contact spring has a reversely directed spring tongue 84 extending therefrom and formed with a pair of piercing points or barbs 85 and 85'.

Base 20 is formed with a central channel 30 to receive a flat type of cord 90 having a pair of stranded conductors 91 embedded in insulation. Channel 30 has a base 31 which slopes downwardly from the hinge end, where the channel is closed by a cross rib 21, to the free end. At the free end, base 31 is formed with an outwardly open recess 32 continued upwardly as a space between end wall portions 22 of base 21. This opening, and recess 32, are closed by a lip 51 on end wall 52 of cover 50 when the receptacle is closed, to form a strain-relief arrangement by "kinking" cord 90.

Latch spring 15, which has legs 16 seating in recesses formed between wall portions 22 and cross webs 23 spaced therefrom, has a central tongue 17 extending perpendicular thereto and overlying channel 30.

Cover 50 is formed with a central, longitudinally extending rib 60 aligned with channel 30 and formed at one end with a step 65. This rib acts as a spacer for the spring tongues 84, properly positioning these tongues laterally for engagement of their barbs 85, 85' with the two conductors of the cord when the receptacle is closed.

To assemble receptacle 10 to cord 90, latch spring 15 is released and the base and cover are swung to the open position of Fig. 3. Cord 90, without any stripping of insulation therefrom, and without any slitting of the cord to separate conductors 91, is inserted into channel 30 until its end abuts rib 21, the cord extending under tongue 16 of spring 15. The cover and base are then closed. As the cover closes toward the base, the two barbs 85 pierce cord 90 and conductors 91 to electrically and mechanically connect contact spring 80 to the respective conductors. The hinge end of rib 60 approaches channel 30 to close on cord 90.

As the closing movement continues, barbs 85' pierce cord 90 to provide strain relief engagement with the cord. While bars 85' may also pierce conductors 91, this is immaterial as the barbs 85 are fully sufficient to make the electrical connection with the conductors. Rib 60 now closes channel 30, with step 65 compensating for the slope of the channel. As cover 50 closes into embracing relation with base 20, lip 51 bends cord 90 downward and forces it into recess 32, as seen in Fig. 4. This bend or kink in cord 90 forms a strain relief arrangement for the cord. Meanwhile, latch spring 15 will have engaged the cooperating abutment on cover 50. The connection of the receptacle to the cord is now complete mechanically and electrically.

The hinge connection of the base and cover includes thickened reinforcing extensions 24 on elevated portions of side walls 26 of base 20, these extensions having arcuate bearing surfaces 25 cooperable with trunnions 55. The latter are formed on the inner surfaces of side walls 53 of cover 50, and are reinforced by end wall portions 54. Trunnions 55 have arcuate surfaces 56 and flat or chord surfaces 57. The latter facilitate initial interengagement of extensions 24 with trunnions 55. Top wall portion 58 of cover 50 has slots 59 receiving extensions 24, as best seen in Fig. 2, and the extensions substantially fill these slots when the receptacle 10 is closed.

Rib 21 forms part of the hinge construction, as it forms an abutment engageable by inwardly bent ends 82 of contact springs 80 after the base and cover are assembled. When extensions 24 are inserted into slots 59, rib 21 springs ends 82 apart and then moves beyond ends 82. The latter then snap behind the rib 21 to prevent retrograde movement thereof, thus "locking" the hinge connection.

Rib 21 is offset inwardly from the hinge edge of base 20 and extends somewhat beyond the flanges 33 of channel 30. The rib ends are spaced from blade guiding surfaces 27 on extensions 24 to form blade receiving slots 28. Slots 28 are complementary to slots 61 in a rib 62 extending across cover wall surface 58 in alignment with end wall portions 54.

Base 32 of channel 30 is formed with longitudinally spaced recesses 34, 34 (Figs. 4 and 7), alignable with barbs or points 85, 85', between which is a deeper recess 36 extending into a cord plug receiving extension 40 on base 20. Wall portion 37, adjacent the hinge end of the base, merges smoothly with a wall 41 of extension 40. This wall is parallel to a somewhat shorter wall 42 which merges smoothly with a wall portion 38 adjacent the free end of the base and offset relatively to wall portion 36 as best seen in Figs. 1, 2 and 3. Side walls 43, 43, which are continuations of side walls 26, interconnect walls 41 and 42. The outer end of the extension is closed by an inwardly recessed wall 44 formed with blade receiving slots 45. The webs 33 of cord channel 30 are extended to wall 45 to form recesses 46 receiving the arms 83 of contact springs 80, the web extensions contacting the inwardly bent ends of these arms.

Cross rib 62 of cover 50 has a central web 63 extending therefrom to a much higher cross web 64 at the hinge end of rib 60. Rib 62 is formed with ridges 66 positionally engaging the bent ends of arms 82 of contact spring 80. The opposite end of rib 60 merges with a cross web 67. The inner junctions of webs 64 and 67 with rib 60 are formed with slots 68 which receive the end edges of tongues 84 of contact springs 80. The end edges are split to form sharp edges which "dig into" the plastic to resist extraction of the contact springs. A central web 71 joins web 67 to a cross web 72 in parallel spaced relation to end wall 52 and connected thereto by webs 73 to form a recess 75 for the latching end of spring 15. On its inner surface, web 72 has locating ridges 74 engaged by the bent ends of arms 86 of contact springs 80.

Cover 50 is formed with a cord plug receiving extension 70 aligned with base extension 40 when the receptacle is closed. Hinge end wall portion 58 merges smoothly with a wall 76 which is parallel to a somewhat shorter wall 76' merging with a wall portion 77 of cover 40 offset from wall 58. Walls 76, 76' are connected by side walls 78, 78 offset inwardly from side walls 96 of cover 50, which latter embrace side walls 26 of base 20 when the receptacle is closed. The outer end of extension 70 is closed by an inwardly recessed wall 94 having blade receiving slots 95.

Wall portion 77 terminates short of end wall 52, and has an outwardly open recess 99 aligned with recess 75. The side edges of wall portion 77 are inwardly offset from side walls 96. Rib 60 extends into extension 70 to join wall 94, dividing the extension into two recesses 97 receiving arms 81 of contact springs 80. Rib 60 has sloping ridges 98 on either side engaging and guiding the inwardly bent ends of arms 81.

Latch spring 15 has its legs 16 reversely bent to form spring means having free ends engageable with partitions or webs 23 to each spring 15 in its seating recesses. The outer arm 11 of spring 15 has an opening 12 formed with a double thickness upper edge 13 provided by bending a tongue 14 back upon arm 11. Edge 13 has latching engagement with an abutment 18 on rib or web 72 extending into recess 75. The bending of tongue 14 back upon arm 11 provides a rounded bearing edge for engagement with abutment 18. This allows the latch spring to "roll off" abutment 18 when the free end of the latch is pulled outwardly to open the receptacle.

When the receptacle is closed, spring 15 enters the recess 75 and its edge 13 latches over abutment 18. To release the latch, the free end of spring 15, lying in recess 99 and extending above end wall 52, is engaged by a finger or thumb nail and pulled outwardly and downwardly. This swings base 20 away from cover 50. It will be noted that the side and end walls of the cover embrace and enclose their counterparts on the base. Wall portions 22 at the free end of base 20 have pins 49 engaging inside cover wall 52 when the receptacle is closed.

While a specific embodiment of the invention has been shown and described in detail to illustrate the application of the invention principles, it will be understood that the invention may be embodied otherwise without departing from such principles.

What is claimed is:

1. A cube tap cord plug receptacle for attachment to a flat type two-conductor insulated cord, said receptacle comprising, in combination, a base member of dielectric material; a cover member of dielectric material hingedly interconnected to said base member; the hinge ends of said members being formed to cooperatively provide a pair of slots to receive the blades of a cord plug; each of said members being formed with an internally recessed extension having an outer wall slotted to receive the blades of a cord plug, and said extensions being aligned when the receptacle is closed; one of said members being formed with a channel extending from its free end toward its hinge end to receive and position a flat type, two-conductor insulated cord; a pair of metal contact springs mounted in the other member in laterally spaced relation and each having edge barbs extending substantially into said channel when the receptacle is closed, the barbs of one spring being spaced laterally of the channel from those of the other spring, whereby the barbs of both springs will pierce a cord in the channel with the barbs of each spring engaging a different one of the cord conductors; each contact spring having three perpendicularly related arms, one arm of each spring extending into the recessed extension of such other member in operative relation with one of the slots therein, the second arm extending toward the hinged end of such other member in operative relation with one of the slots therein, and the third arm extending into the recessed extension of such one member, when the receptacle is closed, in operative relation with one of the slots therein; and interengageable releasable latch means on the free ends of said members.

2. A cord plug receptacle as claimed in claim 1 in which said other member is formed with a rib separating said contact springs and engaging a cord in said channel when the receptacle is closed.

3. A cord plug receptacle as claimed in claim 1 in which the base of said channel has an outwardly open recess in its outer end, and said other member has a wall on its free end with an extension closing said channel and the open side of its recess when the receptacle is closed to bend a cord in the channel at an angle to the channel in its exit from the receptacle to provide a strain-relief arrangement for the cord.

4. A cord plug receptacle as claimed in claim 1 in which said latch means comprises a latch spring extending from the free end of such one member to engage an abutment on such other member, and having an opening aligned with said channel and formed by a tongue bent away from the spring to overlie the channel.

5. A cord plug receptacle as claimed in claim 1 in which said latch means comprises a latch spring extending from the free end of such one member extendable through a recess in the other member to engage an abutment on such other member, and having an opening aligned with said channel and formed by a tongue bent away from the spring to overlie the channel.

6. A cord plug receptacle as claimed in claim 1 including means in said recessed extensions separating and positioning said contact springs.

7. A cord plug receptacle as claimed in claim 1 in which the hinged interconnection between said members includes laterally spaced hinge extensions on such one member extendable through slots in such other member to engage laterally spaced trunnions on the latter; and means engageable by said contact springs locking the hinge extensions in engagement with the trunnions.

8. A cord plug receptacle as claimed in claim 1 in which the hinged interconnection between said members includes laterally spaced hinge extensions on such one member extendable through slots in such other member to engage laterally spaced trunnions on the latter; said contact springs have fourth arms extending toward the hinged ends of said members and having inwardly bent ends; a cross rib on such one member extending between and spaced at each end from said hinge extensions; said rib engaging and spreading said inwardly bent arm ends as the hinge extensions are extended toward said trunnions; and said bent arm ends snapping behind said rib as the hinge connection is completed.

9. A cord plug receptacle as claimed in claim 1 in which said other member has side and end walls partially embracing said one member.

10. A cord plug receptacle as claimed in claim 1 in which the hinged interconnection between said members includes laterally spaced hinge extensions on such one member extendable through slots in such other member to engage laterally spaced trunnions on the latter, and means engageable by said contact springs locking the hinge extensions in engagement with the trunnions; said hinge extensions substantially filling their receiving slots when the receptacle is closed.

References Cited in the file of this patent

UNITED STATES PATENTS

| | | |
|---|---|---|
| 2,609,415 | Benander et al. | Sept. 2, 1952 |
| 2,655,639 | Benander et al. | Oct. 15, 1953 |
| 2,658,184 | Greenbaum | Nov. 3, 1953 |